United States Patent Office 3,584,022
Patented June 8, 1971

---

3,584,022
ORGANOMETALLIC CHELATED COBALT COMPOUNDS AND PROCESS FOR THE PREPARATION THEREOF
Giacomo Costa and Giovanni Mestroni, Trieste, Italy, assignors to Snam Progetti S.p.A., Milan, Italy
No Drawing. Filed June 20, 1968, Ser. No. 738,388
Claims priority, application Italy, June 22, 1967, 17,526/67
Int. Cl. C07f *15/06*
U.S. Cl. 260—439        8 Claims

ABSTRACT OF THE DISCLOSURE

Tetradentate complexes of cobalt having the formula:

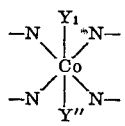

wherein Y' and Y''', which may be the same or different, each represent a monovalent anion, a hydrocarbon radical or a Lewis base, and each N represents a nitrogen atom of a tetradentate chelating agent having at least one but less than four oximic groups and processes for making same are described. The products are valuable intermediates in the synthesis of other compounds and are useful catalysts in themselves.

---

This invention relates to new complexes of cobalt in which chelating agents are bound to the metal atoms through four nitrogen atoms, and to processes for preparing the new complexes.

According to one aspect of the present invention, there is provided a complex of cobalt with a polydentate chelating agent, having in the molecule a group having the following general formula:

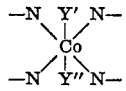

wherein Y' and Y''', which may be the same or different, each represent a monovalent anion, a hydrocarbon radical or a Lewis base, and each N represents a nitrogen atom of a polydentate chelating agent having less than four oximic groups.

Examples of compounds according to the invention include compounds represented by the following general formulae:

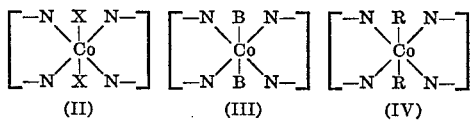

wherein X is a monovalent anion, for example a halide ion; R represents a hydrocarbon radical; and B represents a Lewis base.

Another aspect of the present invention provides processes for preparing the novel compounds of the invention.

In order to prepare a compound having the Formula II, a compound having the formula CoX$_2$ (wherein X is as defined above) is reacted in a solvent of water, alcohol or a ketone, or a mixture thereof, with a tetradentate chelating agent having two oximic groups.

If the compound of Formula II, which may be a bi- or tri-valent cobalt complex, is reacted with sodium borohydride in solvent medium comprising an aqueous alcoholic mixture, for example a water-methanol mixture containing 90% methanol, in the presence of an alkyl halide, a compound of Formula IV is formed. An alternative to the last-mentioned process comprises reacting a tri-valent cobalt complex of the type II with an alkyl Grignard reagent in an inert solvent medium for example tetrahydrofuran to produce an alkylated water-soluble chelated tetradentate complex of trivalent cobalt.

The compounds having the Formula III may be easily prepared by reacting the complexes of the Formula II with a slight excess of a Lewis base. It is convenient to use an alcohol as a solvent for this reaction. The products IV are cationic and water-soluble compounds.

Preferred compounds are those in which the halide anion is a chloride, bromide or iodide anion.

In order to prepare a compound of the Formula I in which one group Y' or Y''' is a hydrocarbon radical and the other group Y''' or Y' is a radical other than a hydrocarbon radical, a compound of Formula II is either reacted with sodium borohydride in the presence of an alkyl halide in an aqueous solvent medium, for example a water-methanol mixture, or reacted with an alkyl Grignard reagent in, as a solvent, an oxygen-containing compound, for example an ether.

It has already been stated that the chelating agent must have less than 4 oximic groups. Preferably the chelating agents have only 2 oximic groups, an example of this type being bis(diacetylmonoxime-imino) 1,3 propane. It is surprising that analogous chelating agents having four oximic groups do not possess the characteristics of the compounds of the invention. The compounds of the invention may be employed as intermediates in organic syntheses and as catalysts in organic reactions.

The invention will now be illustrated by the following examples.

EXAMPLE 1

A 10% suspension of [Co{(DO)(DOH)pn}Br$_2$] wherein (DO)(DOH)pn represents bis (diacetylmonoxime-imino) 1,3 propane, in a methanol-water mixture saturated with methyl iodide, was reacted with a slight excess of sodium borohydride to produce an orange-yellow solution. The methanol was evaporated and the resulting reaction mixture was treated with NaClO$_4$ to give a crystalline precipitate of

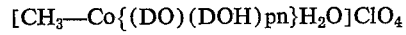
[CH$_3$—Co{(DO)(DOH)pn}H$_2$O]ClO$_4$

*Analysis.*—Calculated for C$_{13}$H$_{26}$N$_4$CoO$_7$Cl (percent): C, 33.46; H, 5.62; N, 13.01. Found (percent): 33.87; H, 5.62; N, 12.89.

EXAMPLE 2

1.15 g. (2.5 m. moles) of [Co{(DO)(DOH)pn}Br$_2$] suspended in anhydrous tetrahydrofuran were reacted with 2.5 m. moles of a methyl Grignard solution in tetrahydrofuran to produce an orange-yellow solution. The reaction mixture, after hydrolysis, evaporation of the tetrahydrofuran and treatment with an aqueous solution of NaClO$_4$ gave a precipitate of:

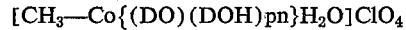
[CH$_3$—Co{(DO)(DOH)pn}H$_2$O]ClO$_4$

The product was recrystallized from acetone and water to produce water soluble orange-red crystals of the formula:

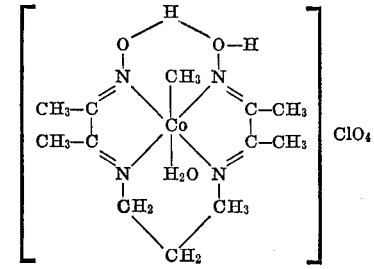

EXAMPLE 3

This example describes the preparation in which two molecules of a Yewis base are bound to each Co atom, in particular the preparation of

[Co{(DO)(DOH)pn}NH₃)₂]Br₂

1.15 g. (2.5 m. moles) of [Co{(DO)(DOH)pn}Br₂] suspended in 50 ml. of ethanol were reacted with a gaseous stream of NH₃ until the complete disappearance of the starting material. A yellow precipitate was obtained and was filtered. This solid was recrystallized by dissolving it in a minimum amount of water and by precipitating it with acetone. The yellow crystals obtained were analyzed as follows:

*Analysis.*—Calcd. (percent): C, 26.85; H, 5.12; N, 17.80. Found (percent): C, 27.08; H, 5.05; N, 16.88.

What is claimed is:

1. Tetradentate complexes of cobalt having the formulae:

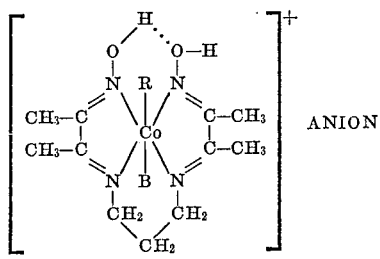

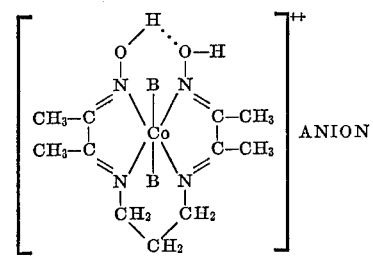

wherein R is alkyl, B is a Lewis base selected from the group consisting of water and ammonia and said anion is selected from the group consisting of Br⁻ and ClO₄⁻.

2. A complex according to claim 1 wherein R is methyl.

3. A complex according to claim 1 wherein R is methyl and B is water.

4. A complex according to claim 1 wherein both B substituents are ammonia.

5. Process for producing a complex having the formula:

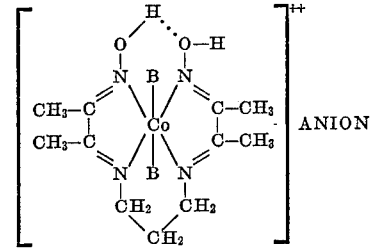

wherein B is selected from the group consisting of water and ammonia and said anion is selected from the group consisting of Br⁻ and ClO₄⁻ which comprises reacting a complex of the formula:

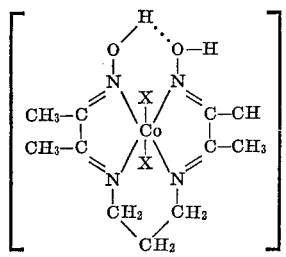

wherein X is a halide anion with a Lewis base selected from the group consisting of water and ammonia in, as a solvent, an alcohol.

6. Process according to claim 5 wherein X is bromo.

7. Process for producing a complex having the formula:

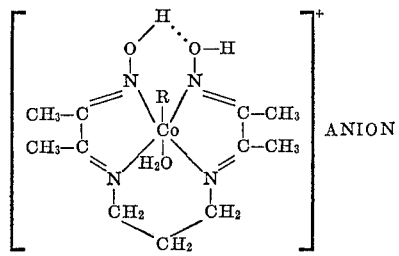

wherein R is alkyl and said anion is selected from the group consisting of Br⁻ and ClO₄⁻ which comprises either reacting a complex of the formula

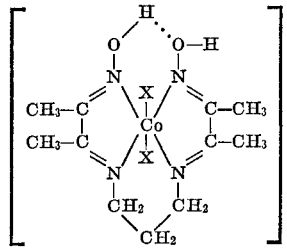

wherein X is a halide anion with sodium borohydride in the presence of an alkyl halide in an aqueous-alcoholic solvent medium of reacting said complex with an alkyl Grignard reagent in, as a solvent, an oxygen-containing compound and then hydrolyzing to provide the desired product.

8. Process according to claim 7 wherein X is bromo.

References Cited

UNITED STATES PATENTS 3,267,115   8/1966   Katon _____ 260—314

OTHER REFERENCES

Dolphin et al.: Chem. Communications, 1965, No. 20, pp. 494–5.

JAMES E. POER, Primary Examiner

A. P. DEMERS, Assistant Examiner

U.S. Cl. X.R.

260—429J